(12) United States Patent
Pologe et al.

(10) Patent No.: US 12,471,792 B2
(45) Date of Patent: Nov. 18, 2025

(54) TAPPED LIGHT IN A LASER-BASED PHOTOPLETHYSMOGRAPHIC DEVICE

(71) Applicant: Zynex Monitoring Solutions, Inc., Englewood, CO (US)

(72) Inventors: Jonas Alexander Pologe, Boulder, CO (US); Theodore Philip Delianides, Boulder, CO (US)

(73) Assignee: Zynex Monitoring Solutions, Inc., Englewood, CO (US)

( * ) Notice: Subject to any disclaimer, the term of this patent is extended or adjusted under 35 U.S.C. 154(b) by 17 days.

(21) Appl. No.: 18/607,796

(22) Filed: Mar. 18, 2024

(65) Prior Publication Data

US 2025/0288215 A1    Sep. 18, 2025

(51) Int. Cl.
*A61B 5/024* (2006.01)

(52) U.S. Cl.
CPC ............................... *A61B 5/02427* (2013.01)

(58) Field of Classification Search
None
See application file for complete search history.

(56) References Cited

U.S. PATENT DOCUMENTS

| | | | |
|---|---|---|---|
| 10,775,149 B1 | 9/2020 | Antonelli | |
| 2002/0068859 A1 | 6/2002 | Knopp | |
| 2015/0078407 A1* | 3/2015 | Kadokura | H01S 3/109 |
| | | | 372/19 |
| 2016/0112138 A1* | 4/2016 | Alfiad | H04B 10/50595 |
| | | | 398/182 |
| 2017/0149203 A1* | 5/2017 | Foley | H04L 9/0825 |
| 2019/0312636 A1* | 10/2019 | Flens | G02B 6/4286 |
| 2021/0273399 A1 | 9/2021 | Gerlach | |
| 2022/0096018 A1 | 3/2022 | Ueda | |
| 2022/0273212 A1 | 9/2022 | Borisevich | |
| 2023/0375525 A1* | 11/2023 | Merritt | G01J 3/021 |
| 2024/0298907 A1* | 9/2024 | Bechtel | A61B 5/02416 |
| 2024/0423542 A1* | 12/2024 | Dachov | A61B 5/14552 |

OTHER PUBLICATIONS

European Search Report for EP App. No. 25160113.4, dated Apr. 11, 2025.

* cited by examiner

*Primary Examiner* — Yi-Shan Yang
(74) *Attorney, Agent, or Firm* — Remenick PLLC

(57) ABSTRACT

A photoplethysmographic device includes a photoplethysmographic monitor, two or more emitters coupled to and controlled by the monitor, the emitters including at least one laser and at least one of the at least one lasers is a tapped laser configured to emit light through a primary optical path from the emitter to a sensor, and a photodetector coupled to the monitor and positioned to receive light tapped from the tapped laser prior to the point where the light exits the sensor, the photodetector generating an electrical signal indicative of the intensity of the amplitude of the light tapped from the tapped laser. The monitor processing the electrical signal to determine the condition of the tapped laser, whereby the monitor determines if the tapped laser is damaged and/or if one or more operating conditions of the tapped laser need to be altered.

17 Claims, 1 Drawing Sheet

TAPPED LIGHT IN A LASER-BASED PHOTOPLETHYSMOGRAPHIC DEVICE

RIGHTS IN THE INVENTION

This invention was made with government support under R44 HL073518 awarded by the National Institutes of Health. The government has certain rights in the invention.

FIELD OF THE INVENTION

This invention is in the field of photoplethysmography.

BACKGROUND OF THE INVENTION

In the science of photoplethysmography, light is used to illuminate or trans-illuminate living tissue for the purpose of providing noninvasive measurements of blood analytes including but not limited to the levels of arterial oxyhemoglobin, carboxyhemoglobin, methemoglobin, reduced hemoglobin, and/or total hemoglobin. Additionally, photoplethysmography can be designed to measure various hemodynamic parameters, and/or tissue properties including, but not limited to, heart rate, respiratory rate, and perfusion.

In this monitoring modality light (typically multiple different spectral bands of light) is directed into living tissue (the "tissue-under-test") and a portion of the light that is not absorbed by the tissue, or scattered in some other direction, is detected a short distance from the point at which the light entered the tissue. These detected light signals, or photoplethysmographic signals (the pulsatile optical signals exiting the living tissue), are converted into electronic signals (or photoplethysmographic data) by a photodetector and are then used to calculate the desired blood analyte levels and/or hemodynamic parameters. A device which generates light to be emitted into the tissue and detects and processes the photoplethysmographic signals (or data) emitted by the tissue, to measure the levels of various blood analytes and/or various hemodynamic parameters, is a photoplethysmographic measurement apparatus, photoplethysmographic device, or photoplethysmographic instrument. A photoplethysmographic device typically includes a photoplethysmographic monitor combined with a sensor. The first widely used commercial photoplethysmographic device was the pulse oximeter, a photoplethysmographic device designed to noninvasively measure, at least, arterial blood oxygen saturation. This device is now used in almost all areas of medicine.

The photoplethysmographic monitor includes electronic circuitry for controlling light emitters that emit light which is then incident on the tissue. The monitor also performs the functions of receiving and processing the photoplethysmographic signals emitted from the tissue, converting these photoplethysmographic data into the various blood analyte and/or hemodynamic parameter measurements, and displaying these measurements on some form of user display. Also included in any photoplethysmographic device is a sensor which is affixed to, or held in place against, the tissue to deliver light from the emitters to the tissue and further includes a photodetector for receiving the photoplethysmographic signals from the tissue.

In the first commercial pulse oximeters the light directed into the tissue was generated by a tungsten lamp and conducted to the sensor by a light guide, in this case a fiber optic bundle. A second fiber optic light guide, also connected to the sensor, picked up light emitted from the tissue and delivered that light back to the monitor, where the received light was split into two paths and passed through two separate interference filters and finally to two separate photodetectors. The photodetectors converted the received photoplethysmographic signals to electronic signals for processing into measurements of oxygen saturation.

This system worked but the optics of the system were extremely bulky and inefficient resulting in very low received light levels making it difficult, if not impossible, to make readings on thicker tissue (e.g. thicker fingers) or on tissue with a high melanin content.

In later pulse oximeters the broadband tungsten light source was replaced with two light emitting diodes (LEDs). One LED had a center wavelength around 660 nanometers (nm), in the red portion of the visible spectrum, and a second LED had a center wavelength around 900 nm or 940 nm, in the near infrared region. These diodes typically were positioned directly in the sensor just a few millimeters away from the tissue they illuminated, generating a strong optical signal for probing the tissue.

This worked well on almost all tissue and made the pulse oximeter into a nearly universally used monitoring device in healthcare. However, using LEDs for photoplethysmographic measurement still had some problems. The spectral content of LEDs, while centered at the required wavelengths, is spectrally very broad, typically about 100 nm. This spectral content can be altered when passing through tissue including by non-arterial pigments, such as fingernail polish or melanin. Changing the spectral content of the LED light causes the pulse oximeter to make inaccurate measurements. For example, the presence of high levels of melanin in a tissue-under-test will cause an LED-based pulse oximeter to read falsely higher arterial oxygen saturations at lower oxygen saturation levels.

To resolve this problem, as well as to make it possible for a photoplethysmographic device to accurately read multiple arterial blood analyte levels, much higher spectral resolution is required. To achieve this higher spectral resolution one can switch to using laser-based light sources for the emitters as lasers, and in particular semiconductor or diode lasers, have a spectral content in the 1 nm range. This is nearly monochromatic compared to LED emitters.

The use of lasers in photoplethysmography, however, also presents certain challenges. This includes how to know if a laser is failing or if it is mode hopping. As a laser fails it may output less light and reduce the signal-to-noise ratio of the photoplethysmographic device. And if the laser that fails is supposed to emit light outside the visible portion of the electromagnetic spectrum, it can be difficult for an end user to visually see that the device is failing. It can also be difficult for the photoplethysmographic device to know whether it is a laser that is failing or if the sensor is simply on a tissue site that is too thick to transmit sufficient light for photoplethysmographic measurement or if there is some other absorber in the optical path, such as a fairly opaque nail polish. Mode hopping can also severely degrade the signal-to-noise ratio of the device. When a diode laser is used in the photoplethysmographic device, it can mode hop. Mode hopping is when the output light of the laser jumps in both spectral content (and therefore, center wavelength) and intensity. While these changes are small they can occur many times per minute, adding noise to the photoplethysmographic signals that the device is trying to read and making accurate photoplethysmographic measurement difficult or impossible. Therefore there is a need for detecting failing or noisy lasers.

SUMMARY OF THE INVENTION

The present invention overcomes the problems and disadvantages associated with current strategies and designs and provides new systems and methods of manufacturing photoplethysmographic devices.

One embodiment of the invention is directed to a photoplethysmographic device. The device includes a photoplethysmographic monitor, two or more emitters coupled to and controlled by the monitor, the emitters including at least one laser and at least one of the at least one lasers is a tapped laser configured to emit light through a primary optical path from the emitter to a sensor, and a photodetector coupled to the monitor and positioned to receive light tapped from the tapped laser prior to the point where the light exits the sensor. The photodetector generates an electrical signal indicative of the intensity of the amplitude of the light tapped from the tapped laser. The monitor processes the electrical signal to determine a condition of the tapped laser and determines if the tapped laser is damaged and/or if one or more operating conditions of the tapped laser needs to be altered.

In a preferred embodiment, the monitor outputs the determined condition of the tapped laser. Preferably, the monitor alters the operating parameters of the tapped laser based on the determined condition of the tapped laser. The determined condition of the tapped laser may be a laser failure, a mode hopping state, or a reduction in optical power output of the tapped laser. Preferably, the monitor is adapted to control the temperature of a housing containing the tapped laser. The monitor is preferably able to change the temperature of the housing in response to the determined condition of the tapped laser being a mode hopping state. In a preferred embodiment, the tapped light is light emitted from a back facet of the tapped laser or is portioned off the primary optical path.

Another embodiment of the invention is directed to a method of determining the condition of one or more lasers in a photoplethysmographic device including a photoplethysmographic monitor. The method includes the steps of emitting light from at least one laser coupled to the monitor and the at least one laser is a tapped laser wherein a portion of the emitted light is a tapped light signal, detecting the tapped light signal from each tapped laser, converting each detected tapped light signal into an electrical signal, processing each electrical signal to determine a condition of the at least one tapped laser, and outputting the condition of the laser.

In a preferred embodiment, the tapped light signal is split off from a primary optical path prior to where the output light exits a sensor. Preferably, the step of processing each electrical signal includes determining if the at least one tapped laser has decreased in output light level more than one to ten percent from its output light level during manufacturing. The method preferably further comprises the step of altering drive current of the at least one tapped laser based on the determined condition of the laser. The method preferably further comprises the step of controlling temperature of a housing in which the at least one tapped laser is installed. Preferably the temperature of the housing is set to a new temperature in response to the condition of the at least one tapped laser. If the condition of the at least one laser is mode hopping, the new set temperature is preferably selected to eliminate the mode hopping.

Other embodiments and advantages of the invention are set forth in part in the description, which follows, and in part, may be obvious from this description, or may be learned from the practice of the invention.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF THE INVENTION

As embodied and broadly described herein, the disclosures herein provide detailed embodiments of the invention. However, the disclosed embodiments are merely exemplary of the invention that may be embodied in various and alternative forms. Therefore, there is no intent that specific structural and functional details should be limiting, but rather the intention is that they provide a basis for the claims and as a representative basis for teaching one skilled in the art to variously employ the present invention.

Figure 1:
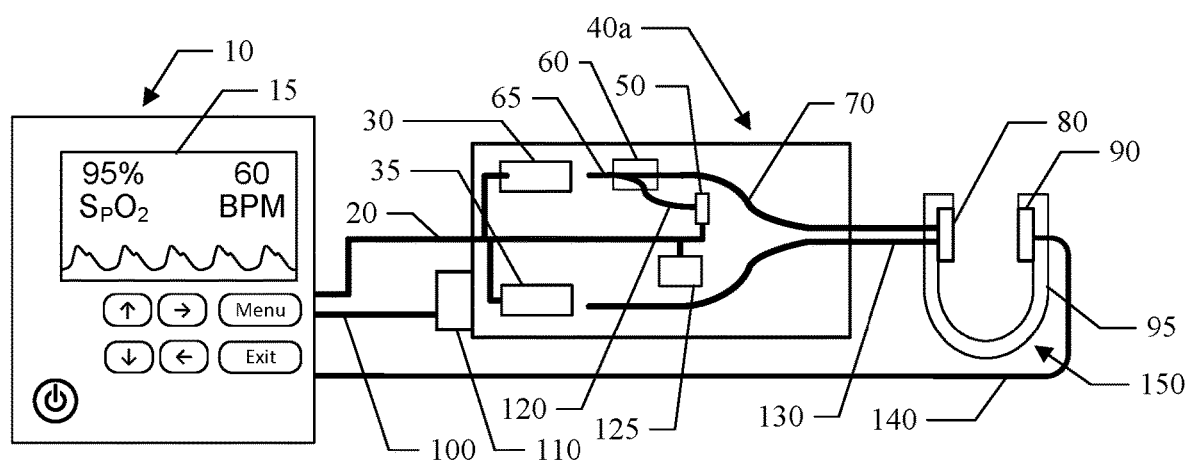
FIG. 1: Photoplethysmographic device with a laser housing containing two emitters, one tapped and one not tapped.

Photoplethysmographic devices, such as that shown schematically in FIG. 1, come in many forms including, but not limited to: a standalone monitor 10 having a built-in display 15 and detachable sensor 150, or devices that transmit the measurements for display to a remote display, on an attached computer, or by another display device such as a smart phone. Photoplethysmographic devices may also be fully integrated devices where the monitor, display, and sensor are integrated into a single device, as is seen in fingertip pulse oximeters.

The photoplethysmographic monitor 10 may also provide other functions and include other components such as a keypad, buttons, or touchscreen for user input, visible indicators (e.g. LED lights), audible enunciators (e.g. speakers) for alarms, and/or wired or wireless connection ports (e.g. USB, RS232, Ethernet, Bluetooth) for digital and analog inputs and outputs.

The photoplethysmographic device shown in FIG. 1 includes a photoplethysmographic monitor 10 with display 15 and various controls for operating monitor 10 and a sensor 150. An emitter module, or housing 40a is connected to the monitor 10 via the connection 20 through which the monitor 10 can control the emitters in housing 40a. The housing 40a may be internal to monitor 10 or may be co-located with the sensor 150, or it may be located externally to both the sensor 150 and the monitor 10. The connection 20 between the monitor 10 and the housing 40a may be a set of wires, circuit board traces, or other direct physical connection, or it may be accomplished via wireless connection. Additionally, connection 20 can be contained in a single cable or can be separated into a set of cables.

Housing 40a may also be temperature controlled, or temperature stabilized, by temperature controller 110. Temperature controller 110 may include a thermoelectric cooler (TEC) mounted on a heat sink, with the housing 40a mounted on the TEC. The temperature controller 110 is coupled to the monitor through cable 100. Note however, that, as with connection 20 from the monitor 10 to the housing 40a, connection 100 from the monitor 10 to the temperature controller can be a direct physical connection or it may be wirelessly connected. Further, the connection 100 to the temperature controller 110 may be completely eliminated if electronic control for the temperature controller is built integrally with the temperature controller 110.

Housing 40a preferably includes two or more emitters 30 and 35 at least one of which is a tapped laser 30. A tapped laser 30 is a laser with at least two optical paths: a primary optical path 70 that transmits light from the tapped laser 30 to the sensor 150, and a secondary or tapped path 120 that transmits a portion of the light output by the tapped laser 30 to a tapped light photodetector 50. This tapped light photodetector 50 converts the tapped optical signal to an electronic signal indicative of the magnitude of the tapped light signal and transmits that signal to the monitor 10 through connection 20. Since the tapped light signal is a proportion of the light output by the tapped laser 30 the monitor 10 can use this signal to determine if the tapped laser is dropping in light output or is unstable in its output light.

In one embodiment, the light out of the tapped laser 30 is coupled into an optical fiber (or other type of light guide, e.g. a fiber bundle or a plastic light guide) 65 and this light guide or optical fiber 65 is split into two light guides or optical fibers by splitter 60. This one-to-two coupler or splitter 60 diverts some portion of the light from the primary optical path 70 to a tapped light path 120 for detection by tapped light photodetector 50 which generates an electronic signal, either analog or digital, indicating the intensity of the light received by the tapped light photodetector 50. This signal is then used by the monitor 10 to determine the status of the tapped laser 30.

Monitor 10 can compare the current signal level from tapped light photodetector 50 to the tapped light photodetector 50 signal level measured and previously stored in a memory element in the photoplethysmographic device. This previously stored signal level may be the level measured, for example, during manufacturing of the monitor 10. This signal level can be programmed into a memory element 125 within, or co-located with, the emitter module, or the memory element may be located in the monitor, or the previously stored signal level can be saved in any non-volatile memory of the photoplethysmographic device 10. The monitor 10 can compare the current tapped light photodetector 50 signal level with the previously stored level and if the current level has fallen by more than a predetermined amount then a message can be presented to the end user by the monitor 10 indicating a drop in output light level of the tapped laser 30 or, if indicated, complete failure of the tapped laser 30. The percentage drop in the tapped light photodetector 50 signal level that is considered large enough to warrant alerting the end user is in the range of 1% to 5%, 10%, 15%, 20%, 25%, 30%, or greater.

The monitor 10 can also use multiple measurements of the tapped light photodetector 50 signal level, over a short period of time (on the order of less than one measurement per minute to as rapidly as many measurements per second), to monitor the stability of the light output by tapped laser 30. A rapidly fluctuating light level indicates a laser that may be mode hopping. To stop this mode hopping behavior the monitor 10 can alter the operating conditions or parameters of the mode hopping emitter(s) in one or more ways. For example, increasing or decreasing the drive current of the mode hopping emitter(s) and/or increasing or decreasing the operating temperature of the housing 40a, a drive current or a temperature at which the mode hopping tapped emitter(s) 30 will no longer mode hop can be found, thus creating a stable optical signal for photoplethysmographic measurements by the monitor 10.

As seen in FIG. 1 the point at which the light is tapped off from the primary optical path 70 preferably occurs between the tapped laser 30 and the output aperture 80 in the sensor 150, prior to the point where the light exits the sensor, and where, if there was a finger or an ear lobe or other tissue in the sensor, the light would enter the tissue. The primary optical path 70 is preferably directed to output aperture 80 by light guide 130. Once the light enters the tissue the light is scattered and, to some extent, absorbed by the tissue in the sensor 150. The sensor 150 holds both output aperture 80 and the input aperture and/or sensor photodetector 90 in place against the tissue. The sensor provides a structure 95, which may be a plastic housing, as is the case for many reusable pulse oximetry sensors, or a tape structure, as is used in many single patient use pulse oximetry sensors. This structure 95 of sensor 150 keeps the output aperture 80 and the sensor photodetector 90 in place against the tissue The sensor photodetector 90 picks up light emitted by the tissue, and converts this light to an electronic signal, which is conducted back to monitor 10 through cable 140 (or via a wireless connection) to be processed by the monitor 10 into the blood analyte levels, hemodynamic parameters, and tissue parameters to be displayed by the monitor 10 or sent out by the monitor 10 for remote display or further processing.

The housing 40a may also contain additional emitters that may or may not be tapped lasers. For example, emitter 35 may be an additional laser, an LED, or another form of emitter. As shown, emitter 35 is also coupled to a light guide 130 which is directed to sensor 150 and whose light is also output through output aperture 80.

In some embodiments, each laser, whether or not the laser is tapped, may be in its own housing, each of which may have its own associated temperature controller. Alternatively, several lasers, or all the lasers in the photoplethysmographic device may occupy the same housing with just a single associated temperature controller.

It is also recognized that sensor photodetector 90 may not be housed directly in the sensor. In magnetic resonance imaging (MRI) compatible photoplethysmographic sensors, it is desirable to keep all electrical signals away from the MRI machine and all electronics away from the patient. As a result, for an MRI compatible sensor, the sensor photodetector 90 may be located at a distance from the sensor and light exiting the tissue, at the position where sensor photodetector 90 is shown in FIG. 1, would be coupled into a light guide and conducted to sensor photodetector 90 at a distance from the sensor.

The type of photodetectors used in this photoplethysmographic device would typically be silicon photodiodes as they are inexpensive, can be provided with a large surface area to allow collection of large amounts of light, and are electronically very quiet and linear devices. However, many different types of photodetectors are available and could be used in this application including germanium photodiodes, gallium arsenide photodiodes, indium gallium arsenide photodiodes, and phototransistors.

Figure 2:
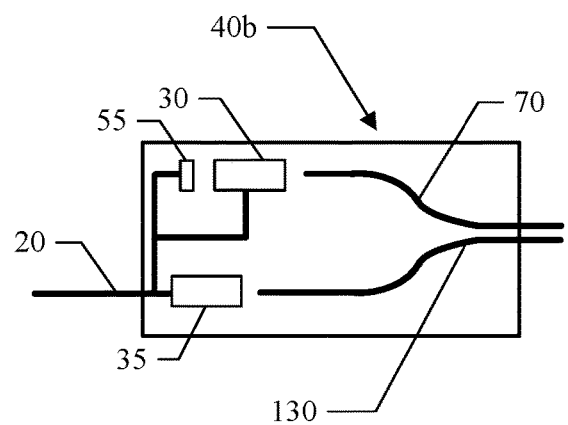
FIG. 2: Photoplethysmographic device with a laser housing containing two emitters, one having light emitted from the front and rear facets and one not tapped.

FIG. 2 shows an alternate embodiment of the housing 40b. Diode lasers are often designed to emit light from both the front and rear facet of the laser. Typically, these types of lasers will emit the majority of their output light through the front facet and a smaller percentage of their output light through the rear facet. In housing 40b, the tapped laser 30 emits light from both the front and the rear facets of the laser. The light exiting the front facet is coupled to the light guide 70 and is the primary optical path, carrying light to the sensor. The light exiting the rear facet, or back facet, of the tapped laser 30 is the tapped light and is incident on the back facet tapped light photodetector 55. This light signal is converted to an electronic signal by back facet tapped light photodetector 55 which is transmitted back to the monitor 10 by connection 20. Emitter 35 is not a tapped emitter and therefore only has a single optical path through light guide 130. As with the previously described housing 40a, housing 40b can contain numerous tapped and untapped lasers or other emitters, and/or the photoplethysmographic device may contain several emitter modules (housings).

Other embodiments and uses of the invention will be apparent to those skilled in the art from consideration of the specification and practice of the invention disclosed herein. All references cited herein, including all publications, U.S. and foreign patents and patent applications, are specifically and entirely incorporated by reference. It is intended that the specification and examples be considered exemplary only with the true scope and spirit of the invention indicated by the following claims. Furthermore, the term "comprising of" includes the terms "consisting of" and "consisting essentially of."

The invention claimed is:

1. A photoplethysmographic device comprising:
a photoplethysmographic (PPG) monitor;
two or more emitters coupled to and controlled by the PPG monitor;
the two or more emitters including at least one laser and at least one of the at least one lasers is a tapped laser configured to emit a primary light through a primary optical path from the tapped laser to a sensor, the tapped laser further configured to emit a tapped light; and
a photodetector coupled to the PPG monitor and positioned to receive the tapped light from the tapped laser;
the photodetector adapted to generate an electrical signal indicative of intensity of amplitude of the tapped light from the tapped laser;
the PPG monitor adapted to process the electrical signal to determine a condition of the tapped laser;
whereby the PPG monitor determines if the tapped laser is damaged and/or if one or more operating conditions of the tapped laser needs to be altered.

2. The device of claim 1, wherein the PPG monitor outputs the determined condition of the tapped laser.

3. The device of claim 1, wherein the PPG monitor alters operating parameters of the tapped laser based on the determined condition of the tapped laser.

4. The device of claim 1, wherein the determined condition of the tapped laser is a laser failure.

5. The device of claim 1, wherein the determined condition of the tapped laser is a mode hopping state.

6. The device of claim 1, wherein the PPG monitor is adapted to control temperature of a housing containing the tapped laser.

7. The device of claim 6, wherein the PPG monitor changes the temperature of the housing in response to the determined condition of the tapped laser being a mode hopping state.

8. The device of claim 1, wherein the determined condition of the tapped laser is a reduction in optical power output of the tapped laser.

9. The device of claim 1, wherein the tapped light is light emitted from a back facet of the tapped laser.

10. The device of claim 1, wherein the tapped light is portioned off the primary optical path.

11. A method of determining a condition of one or more lasers in a photoplethysmographic (PPG) device including a photoplethysmographic (PPG) monitor comprising the steps of:
emitting light from at least one of the one or more lasers coupled to the (PPG) monitor, at least one laser is a tapped laser wherein a portion of the emitted light is a tapped light signal;
detecting the tapped light signal from each of the tapped lasers;
converting each detected tapped light signal into an electrical signal;
processing each electrical signal to determine a condition of the associated tapped laser; and
outputting the condition of each tapped laser.

12. The method of claim 11, wherein the tapped light signal is split off from a primary optical path prior to where the emitted light in the primary optical path exits a sensor.

13. The method of claim 11, wherein the step of processing each electrical signal includes determining if each tapped laser has decreased in output light level more than one percent from its output light level during manufacturing.

14. The method of claim 11, further comprising the step of altering drive current of at least one tapped laser based on the determined condition of the at least one tapped laser.

15. The method of claim 11, further comprising the step of controlling temperature of one or more housings in which the one or more tapped lasers are installed.

16. The method of claim 15, wherein the temperature of the one or more housings is set to a new temperature in response to the condition of at least one tapped laser within that housing.

17. The method of claim 16, wherein the condition of the at least one laser is mode hopping and the new set temperature is selected to eliminate the mode hopping.

* * * * *